Feb. 25, 1964 J. HIRSCH 3,122,383
JOINT STRUCTURE FOR CYLINDRICAL MEMBERS
Filed Feb. 17, 1959 4 Sheets-Sheet 1
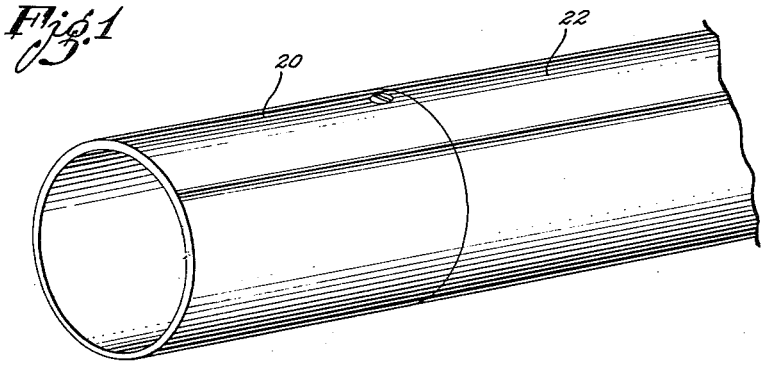
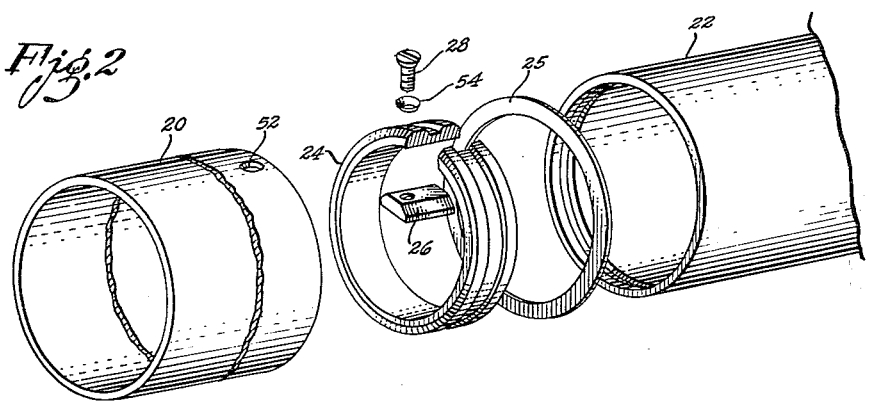
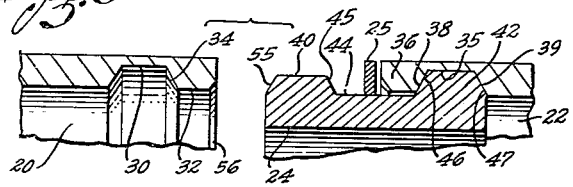
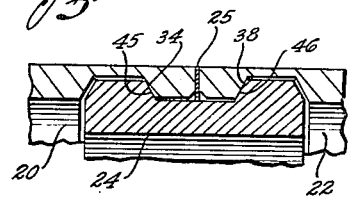
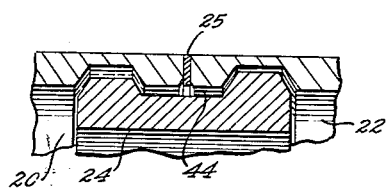
INVENTOR:
Joseph Hirsch
By Smyth & Roston
Attorneys

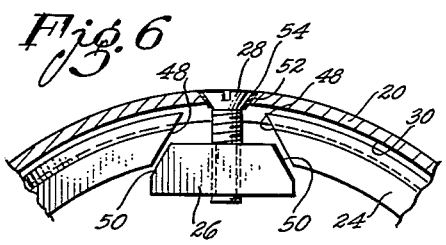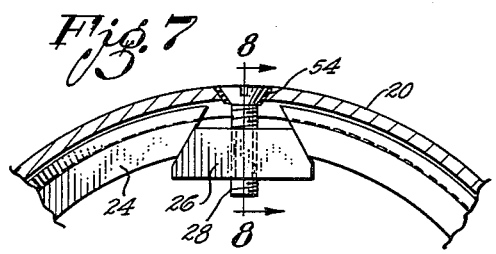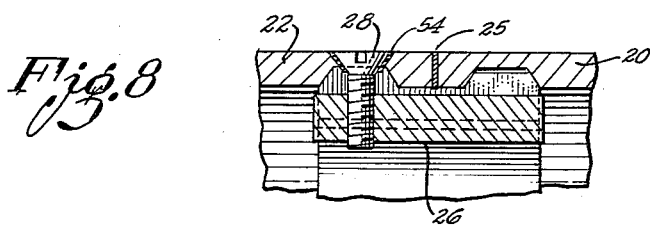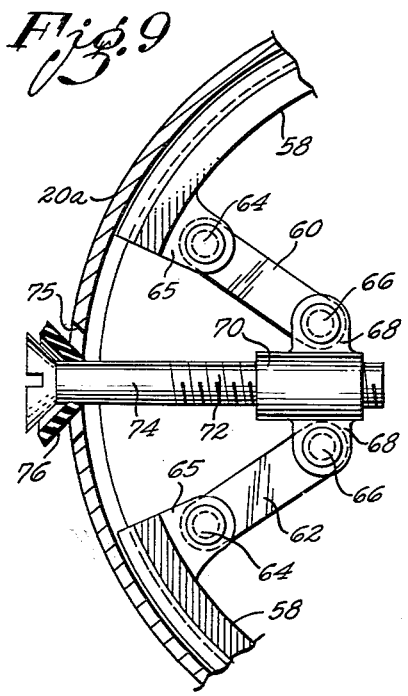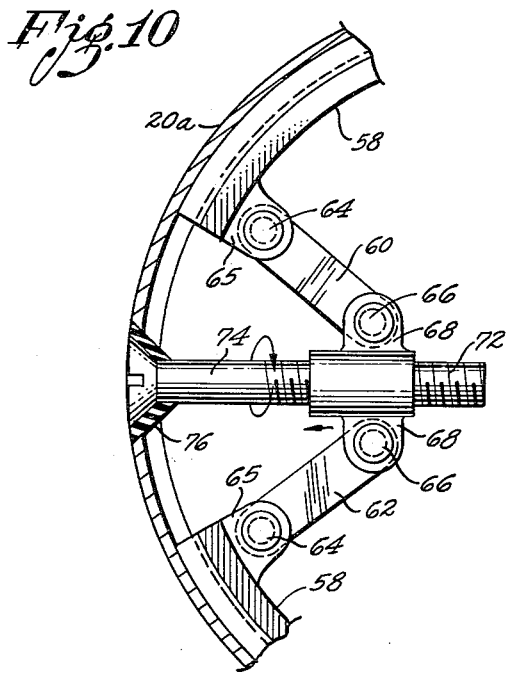

Feb. 25, 1964　　　J. HIRSCH　　　3,122,383
JOINT STRUCTURE FOR CYLINDRICAL MEMBERS
Filed Feb. 17, 1959　　　　　　　　　　　　　　　4 Sheets-Sheet 3
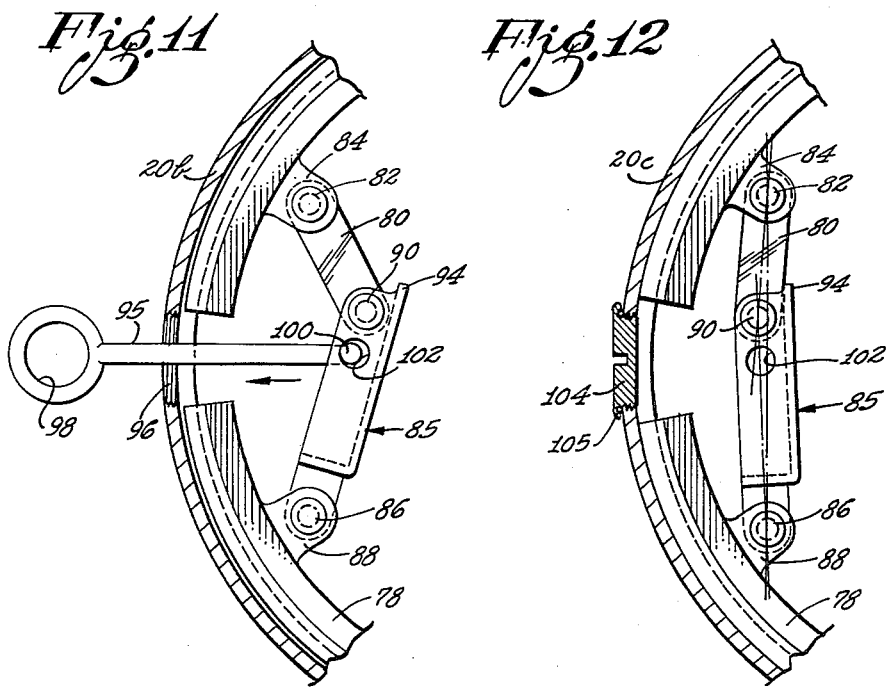
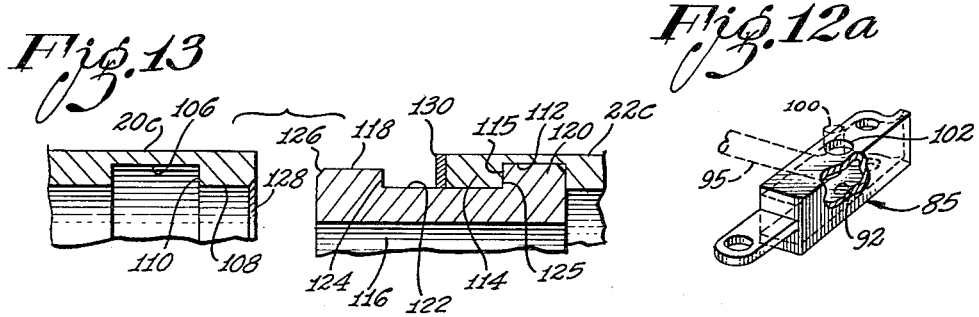
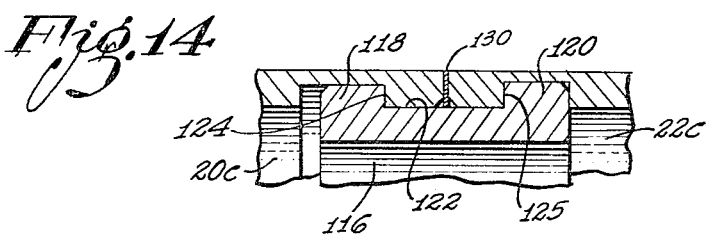
INVENTOR:
Joseph Hirsch
By Smyth & Roston
Attorneys

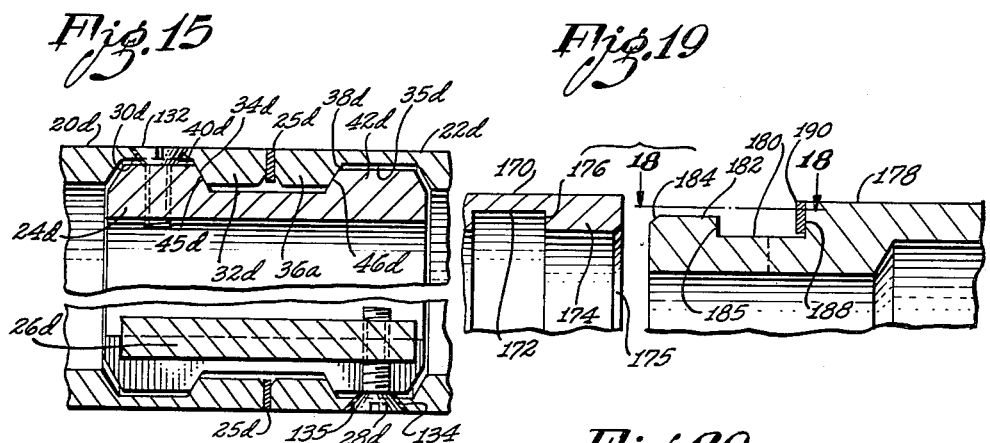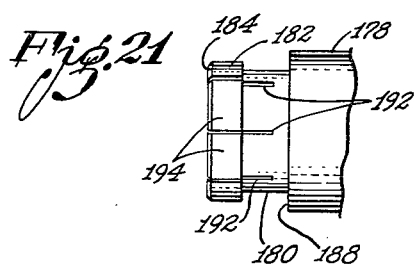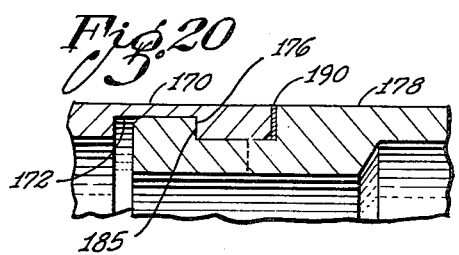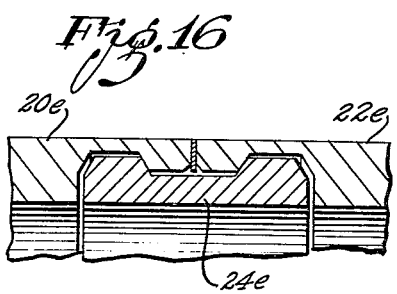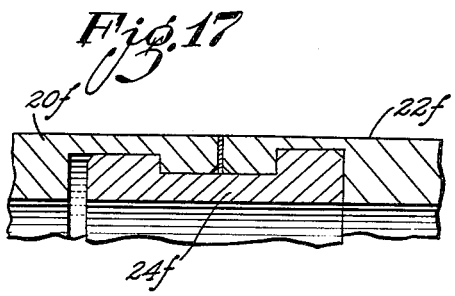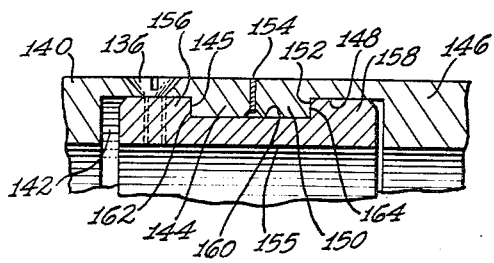

United States Patent Office 3,122,383
Patented Feb. 25, 1964

3,122,383
JOINT STRUCTURE FOR CYLINDRICAL
MEMBERS
Joseph Hirsch, 1117 Fiske St., Pacific Palisades, Calif.
Filed Feb. 17, 1959, Ser. No. 793,891
2 Claims. (Cl. 285—397)

This invention relates to a joint structure for interconnecting tubing or hollow cylindrical members. The invention is particularly directed to the numerous problems that arise in the provisions of means to interconnect thin-walled cylindrical members of relatively large diameters such as sections of missiles, rockets, ramjet engines, thin-walled tanks, fluid conduits and the like.

The problems arising in various situations and installations include: the problem of interconnecting thin-walled cylindrical members that are too large in diameter for screw threads to be practical; the problems of providing externally flush joints for avoiding aerodynamic drag; the problem of providing internally flush cylinders to minimize fluid flow friction losses; the problem of providing a tight joint construction that does not require precision dimensioning but, on the contrary, permits a liberal range in tolerance of the interfitting parts; the problem of making a joint between two cylindrical members without requiring thickening of the ends of the cylindrical walls; the problem of providing a joint arrangement in which material is removed from the ends of confronting cylinders for interconnecting the cylinders in a positive manner without the removal of the material, sacrificing needed strength; the problem of providing a joint that may be repeatedly dismantled and reassembled; and the problem of meeting these various requirements with simple structure of a minimum number of parts that may be assembled in minimum time without requiring special skill or special tools.

Broadly described, the invention meets these and related problems by a joint structure in which each of the two confronting ends of the two cylindrical members is formed with an inner rearwardly directed circumferential shoulder and an internal retaining ring of split construction bridges the two cylindrical ends with outer circumferential shoulders of the ring in positive engagement with the internal shoulders for interlocking the two cylindrical members. Usually, a suitable sealing ring is provided between the confronting cylinder ends to make the joint fluid-tight.

In some practices of the invention, the mutually contacting faces of the pairs of cooperating shoulders are substantially in planes perpendicular to the axis of the two cylindrical members. Such an arrangement provides positive locking action with no tendency whatsoever for the internal retaining ring to contract and release in response to axial forces that tend to separate the two cylindrical members. In this regard, a further feature is that a resilient sealing ring in compression between the two cylindrical ends may not only serve its primary purpose of making the joint fluid-tight but also may serve as resilient means to create pressure at the mutually contacting faces of the cooperating shoulders. The increased pressure creates high frictional resistance to contraction of the retaining ring even when no fluid pressure exists inside the joint.

In other practices of the invention, the inner circumferential shoulders of the confronting cylindrical ends and the cooperating outer circumferential shoulders of the retaining ring are shaped for cam action to draw the two cylindrical members towards each other in response to joint-tightening expansion of the retaining ring. For this purpose, the retaining ring may be a single-piece ring split to form two spaced ends so that the ring may be contracted in the course of the assembly procedure and, thereafter, suitable spreader means may be used between the spaced ends to expand the ring for the required joint-tightening cam action. The spreader means may be a radially outwardly movable wedge member, for example, or may be a radially outwardly operable toggle linkage.

I am aware that an external retaining ring with inner circumferential shoulders has been used heretofore to engage external circumferential shoulders of confronting cylindrical members for the purpose of joining the two members. There are, however, numerous unexpected advantages in the use of an internal retaining ring. These advantages will now be discussed.

One advantage of an internal retaining ring over an external retaining ring is that it, in effect, completely eliminates the problem of designing a joint for low external aerodynamic drag. Another advantage is that the inner retaining ring serves as an internal rib to stiffen the two surrounding cylindrical members. Another advantage is that the expanded internal retaining ring places the surrounding cylindrical wall under circumferential tension instead of placing the cylindrical wall under external crushing pressure.

A further important advantage of using an internal retaining ring is that it makes possible the use of a spreader means under compression between the two ends of the retaining ring to serve as positive means to keep the ring at its effective expanded diameter. A further important advantage is that an internal retaining ring makes it possible to use a simple wedge or toggle mechanism for ensuring tight fit of the ring under compression with liberal tolerance for variations in dimensions of the cylindrical members with which the ring is employed. A still further advantage of an internal retaining ring is that it may be expanded and retained in expanded state by either a wedge or a toggle mechanism in combination with a screw means acting radially outwardly on the wedge or toggle. In such an arrangement, the force-multiplying effect of the screw itself is added to the force-multiplying effect of the wedge or toggle that is actuated by the screw.

An additional advantage of using an internal retaining ring is that the ring is not exposed to damage by external forces. This advantage is especially important if solely the resiliency of the retaining ring is relied upon to keep the retaining ring expanded for interlocking the two cylindrical members. If the resiliency of the retaining ring is depended upon in this manner, the joint may be constructed to close with a simple snap action, the assembly procedure consisting simply of forcing together the two confronting cylindrical ends together with the retaining ring positioned inside the confronting ends to snap into locking position.

With reference to ease of assembly, a further feature of the invention is the provision of three different arrangements for initially relating the retaining ring with one of the cylindrical members for movement therewith in the snap-action assembly procedure. As will be explained, in one arrangement the retaining ring has a pair of external circumferential ribs with one rib of larger diameter than the other to cause the retaining ring to remain in engagement with one of the two confronting cylindrical ends as the two cylindrical ends are forced together for assembly of the joint. In another arrangement, the retaining ring is mechanically connected with one of the confronting cylindrical ends for movement therewith, the connection being accomplished, for example, by means of a radial screw. In the third arrangement, the retaining ring is integral with one of the two confronting cylindrical ends.

The various features and advantages of the invention may be understood from the following detailed description together with the accompanying drawings.

In the drawings, which are to be regarded as merely illustrative:

FIG. 1 is a perspective view of two cylindrical members joined together by one embodiment of the invention;

FIG. 2 is a perspective exploded view of the same joint structure;

FIG. 3 is a fragmentary longitudinal sectional view showing the confronting ends of the two cylindrical members spaced apart in preparation for closing the joint;

FIG. 4 is a similar sectional view showing the confronting ends brought together and engaged by the internal retaining ring with the retaining ring in loose state;

FIG. 5 is a similar sectional view with the retaining ring expanded into tight engagement with the two cylindrical ends to complete the joint;

FIG. 6 is a transverse sectional view showing the inner retaining ring in loose state as in FIG. 4;

FIG. 7 is a similar transverse sectional view showing the wedge drawn tight to expand the ring and tighten the joint as in FIG. 5.

FIG. 8 is a fragmentary longitudinal view through the wedge member taken as indicated by the line 8—8 of FIG. 7;

FIG. 9 is a fragmentary sectional view of a second embodiment of the invention which employs screw-actuated toggle links to expand the inner retaining ring, the retaining ring being shown in loose state;

FIG. 10 is a view similar to FIG. 9 with the toggle-actuating screw tightened to expand the inner retaining ring;

FIG. 11 is a fragmentary sectional view of a third embodiment of the invention showing the retaining ring in loose state in preparation for expansion of the ring by tool-operated toggle links;

FIG. 12 is a view similar to FIG. 11 showing the retaining ring expanded to complete the joint;

FIG. 12a is a perspective view of one of the toggle links shown in FIGS. 11 and 12;

FIG. 13 is a fragmentary longitudinal sectional view illustrating another embodiment of the invention, the confronting ends of the two cylindrical members being positioned in preparation for movement together to complete a joint by means of an inner snap-acting retaining ring;

FIG. 14 is a similar view with the confronting ends of the two cylindrical members moved together to complete the joint;

FIG. 15 is a fragmentary longitudinal sectional view of an embodiment of the invention in which an inner cam-acting retaining ring is held loosely in place by a screw for the purpose of the assembly procedure;

FIG. 16 is a longitudinal sectional view showing how a joint may be constructed with an inner cam-acting retaining ring flush with the inner circumferential surfaces of the two interconnected cylindrical members;

FIG. 17 is a similar view showing how an inner snap-acting retaining ring may lie flush with the inner circumferential surfaces of the two interconnected cylindrical members;

FIG. 18 is a similar view showing how a flush snap-acting inner retaining ring that is anchored by a screw for the assembly procedure may be flush with the inner circumferential surfaces of the two cylindrical members;

FIG. 19 is a fragmentary longitudinal sectional view illustrating a form of the invention in which the inner retaining ring is, in effect, integral with one of the two cylindrical members, the two cylindrical members being positioned in preparation for closing movement to complete the joint;

FIG. 20 is a view similar to FIG. 19 showing the joint completed; and

FIG. 21 is a perspective view on a reduced scale of the end of the cylindrical member that has the inner retaining ring integral therewith.

In FIGS. 1 to 8, illustrating the first embodiment of the invention, a first cylindrical member 20 and a second cylindrical member 22 are interconnected by an inner retaining ring 24. The joint is sealed in a fluid-tight manner by a sealing ring 25 which may be omitted in some applications of the invention. The inner retaining ring 24 is adapted to be expanded by means of a wedge member 26 under the control of a suitable screw 28 for tightening the joint.

As best shown in FIGS. 3 to 5, the first cylindrical member 20 is provided with an inner circumferential groove 30 which forms an inner circumferential rib 32, the inner circumferential rib forming an inner circumferential shoulder 34 that faces rearward, i.e., away from the open end of the cylindrical member. The inner circumferential groove is of tapered cross-sectional configuration so that the inner circumferential shoulder 34 is inclined relative to a plane that is perpendicular to the axis of the cylindrical member. This inner circumferential shoulder 34 may be aptly termed an inner cam shoulder since its purpose is to cooperate with the retaining ring 24 for cam action to tighten the joint.

The second cylindrical member 22 is also provided with an inner circumferential groove 35 of tapered cross-sectional configuration which forms an inner circumferential rib 36 at the end of the cylindrical member. Here again the inner circumferential rib has a rearwardly facing inner circumferential cam shoulder 38 for cooperation with the retaining ring 24. The inner circumferential groove also forms a forwardly facing inner shoulder 39 to serve a purpose that will be explained.

The inner retaining ring 24 has two outer circumferential ribs 40 and 42, respectively, separated by an outer circumferential groove 44. The outer circumferential groove 44 is of tapered cross-sectional configuration so that the rib 40 forms a tapered outer circumferential cam shoulder 45 for cooperation with the previously mentioned inner circumferential cam shoulder 34 and the second rib 42 forms a tapered outer circumferential cam shoulder 46 for cooperation with the previously mentioned inner circumferential cam shoulder 38. The second rib 42 also forms an outer shoulder 47 for cooperation with the previously mentioned inner shoulder 39.

The inner retaining ring 24 is of split construction, as shown in FIG. 2, and, as shown in FIGS. 6 and 7, the two ends of the retaining ring are formed respectively with convergently inclined end faces 48 for cooperation with corresponding wedge faces 50 of the wedge member 26. The screw 28 is threaded through the wedge member 26 to draw the wedge member tight and for this purpose the screw extends through an aperture 52 (FIG. 2) in the cylindrical member 20. In this instance, the screw 28 has a tapered head, as shown, and the aperture 52 is correspondingly tapered to permit the head of the screw to seat in the aperture substantially flush with the outer circumferential surface of the cylindrical member, as shown in FIGS. 1 and 7. If a fluid-tight joint is required, a tapered gasket 54 is inserted under the tapered head of the screw.

It is contemplated that the procedure of assembling the joint will be the simple one exemplified by FIGS. 3 to 5. This procedure consists simply of contracting the split retaining ring 24 to receive the sealing ring 25 and to permit the rib 42 of the retaining ring to seat in the inner circumferential groove 35 of the cylindrical member 22. The next step is simply to force the two ends of the cylindrical members together to cause the rib 40 of the retaining ring to seat in the inner circumferential groove 30 of the cylindrical member 20, as indicated in FIG. 4. In the course of this procedure, the wedge member 26 is held loosely in position for the subsequent wedging action, the wedge member being sufficiently confined by the end faces 48 of the retaining ring to maintain the desired orientation while it is loose. The last step consists simply of tightening the screw to draw the wedge tight, the final position of the wedge being shown in FIGS. 7 and 8.

One requirement for the described mode of operation is that the retaining ring be resilient and be biased to make at least loose engagement with the two grooves 30 and 35 of the two cylindrical members. In other words, the unrestrained diameter of the resilient ring should be large enough to cause the ring to make engagement with the two cylindrical members without the aid of the wedge 26.

A second requirement is that the parts be shaped and dimensioned so that the cam action between the pairs of shoulders 34 and 45 in cooperation with the cam action between the second pair of cam shoulders 38 and 46 will force the two confronting ends of the cylindrical members together for a tight joint. In this instance, the sealing ring 25 is interposed between the ends of the two cylindrical members and the parts are dimensioned accordingly, i.e., the two ribs 32 and 36 are somewhat narrower than would be required for a tight joint in the absence of the sealing ring 25. In this regard, a feature of the invention is that a certain desirable latitude in dimensions is permissible since the pairs of cam shoulders may engage to various degrees. Thus, in FIG. 5 in which the joint is tight, there is still clearance for additional cam action between the pair of shoulders 34 and 45 and between the pair of shoulders 38 and 46. It is apparent that a tight joint may be made with a liberal range of variation of the dimensions of the cooperating parts. Another feature in this regard is the fact that the sealing ring 25 may be resilient for resilient resistance to the cam action. This resilience in itself permits tolerance in dimensions and, in addition, the yielding compression of the sealing ring tends to spread the joint apart and thereby opposes the cam action to maintain the screw 28 under tension.

A third requirement for the described mode of operation is that the retaining ring 24 be automatically contracted to permit the rib 40 of the ring to pass through the end rib 32 of the cylindrical member 20 when the two cylindrical members are forced together. For this purpose, the leading face of the rib 40 of the retaining ring is tapered to provide a cam face 55 for cooperation with the rib 32 to cause the required contraction of the retaining ring. Preferably, the rib 32 also is shaped to facilitate the desired camming action. In this instance, the leading edge of the rib 32 is provided with a chamfer 56.

A further requirement for the described mode of action is that some provision be made to keep the inner retaining ring in the position relative to the cylindrical member 22 that is shown in FIG. 3 when the two cylindrical members are forced together. A problem arises in that the automatic contraction of the retaining ring 24 to pass through the rib 32 of the cylindrical member 20 may be sufficient to disengage the retaining ring completely from the cylindrical member 22, i.e., sufficient to dislodge the rib 42 of the retaining ring from the groove 35 of the cylindrical member 22. A feature of this particular embodiment of the invention is the concept of solving this problem by making the rib 42 of the retaining ring 24 of greater outside diameter than the rib 40 and by making the inner circumferential groove 35 of the cylindrical member 22 deep enough to accommodate the increased diameter of the rib. The difference in diameters of the two ribs is apparent in FIGS. 3 to 5. It may be readily appreciated that by virtue of these relative dimensions, the rib 42 of the retaining ring remains partially in the surrounding groove 35 of the cylindrical member 22 when the retaining ring is contracted by the cam action of the cam face 55 to permit the rib 40 to pass through the rib 32. The function of the cooperating shoulders 39 and 47 now becomes apparent.

It is these shoulders that hold the retaining ring advanced relative to the cylindrical member 22 when the retaining ring contracts to enter rib 32, the retaining ring being held sufficiently advanced for engagement of the two cam shoulders 34 and 45 when the cylindrical members are brought together.

As heretofore pointed out, the cam faces 45 and 46 of the retaining ring 24 must be spaced apart and the end ribs 32 and 36 of the two cylindrical members must be dimensioned to cause the cam action to tighten the joint but, as also previously pointed out, the cam action inherently permits liberal tolerances in dimensions. The width of the inner circumferential groove 30 of the two cylindrical members is not critical since it may be much wider than the corresponding rib 40 of the retaining ring. The width of the inner groove 35, however, must be close to the width of the corresponding rib 42 for the two shoulders 39 and 47 to hold the retaining ring 24 sufficiently advanced when the two cylindrical members are forced together.

With reference to tolerances, it is also to be noted that the wedge member 26 inherently permits a wide latitude of dimensions. It is apparent that with the wedge member fully tightened to the degree shown in FIG. 7, slight reduction in the circumferential dimension of the retaining ring would simply mean a radial shift in the fully tightened position of the wedge member and, in like manner, a slight increase in the inside diameters of the surrounding cylindrical members would also mean merely a radial shift in the fully tightened position of the wedge.

In the second embodiment of the invention shown in FIGS. 9 and 10, a retaining ring 58 is employed of the same cross-sectional configuration as the previously described retaining ring 24 and the confronting ends of the two cylindrical members that are to be interconnected are shaped and dimensioned with internal grooves for cooperation with the retaining ring in the retaining ring in the previously described manner. This embodiment of the invention is characterized by the concept of employing a pair of toggle links 60 and 62 to cause the spreading of the retaining ring for tightening of the joint. The two toggle links are connected by pivots 64 to ears 65 on the two ends of the retaining ring 58 and are connected by pivots 66 with a pair of opposite ears 68 of a sleeve-like nut 70. The nut 70 is engaged by a screw thread 72 of a screw 74 that extends through an aperture 75 in a cylindrical member 20a. In the previously described manner, the screw 74 has a tapered head with the aperture 75 tapered accordingly and a tapered sealing gasket 76 is positioned under the head.

The joint illustrated by FIGS. 9 and 10 is closed by substantially the same sequence of steps as employed in the first embodiment of the invention. In preparation for closing the joint, the screw 74 is loosened, as shown in FIG. 9, to give the retaining ring 58 the required freedom for contraction when the two cylindrical members are forced together. The final step is to tighten the screw 74, as indicated in FIG. 10, to complete the joint. Here again, considerable tolerance in the dimensioning of the parts is permitted since the nut 70 may take various positions relative to the screw 74 at the fully expanded state of the retaining ring.

The embodiment of the invention illustrated by FIGS. 11 and 12 also employs a toggle linkage for expansion of a retaining ring 78. Here again, the retaining ring may be of the same general configuration as the first described retaining ring 24 and the two confronting ends of the cylindrical members that are to be interconnected may be shaped and dimensioned with internal grooves for cooperation with the retaining ring in the previously described manner.

In FIGS. 11 and 12, a first toggle link 80 is connected by a pivot 82 to an ear 84 on one end of the retaining ring 78 and a second toggle link 85 is connected in a similar manner by a pivot 86 to an ear 88 on the second end of the retaining ring. The two toggle links are interconnected by a pivot 90.

The toggle link 85 may be of the construction shown in FIG. 12a. The toggle link 85 is formed with a channel 92 to receive the end of the toggle link 80 and is also formed with a lip 94 at the end of the channel. When the two toggle links are moved from their contracted positions shown in FIG. 11 to their extended positions shown in FIG. 12, the pivot 90 moves past center and the lip 94 moves into abutment against the link 80 to cooperate therewith. The pivot 90 may be said to move past center in the sense that it moves across a straight line that interconnects the axes of the two pivots 82 and 86.

It is contemplated that the two toggle links 80 and 85 will be expanded by means of a suitable tool 95 and that the surrounding cylindrical member 20b will be provided with a suitable aperture 96 for access by the tool. In this instance, the tool has a handle 98 at its outer end to facilitate manipulation, and this handle may be in the form of a loop or eye, as shown, for engagement by a second tool (not shown). The inner end of the tool 95 is in the form of a hook 100 and one wall of the channel 92 of the toggle link 85 has an aperture 102 to receive the hook.

To carry out the operation of expanding the retaining ring 78 to complete the joint, the hook 100 is inserted through the aperture 96 in the manner shown in FIG. 11 and then the tool is pulled outward to expand the two toggle links to the positions shown in FIG. 12. The tool is then disengaged from the toggle link 85 and withdrawn through the aperture 96. Where a fluid-tight joint is required, the aperture 102 is threaded to receive a flat plug 104. The plug may be flanged as shown to retain a small sealing ring 105.

FIGS. 13 and 14 show how an inner retaining ring may function with a snap action to interlock the confronting ends of a pair of cylindrical members. The resilience of the retaining ring is relied upon solely to maintain the joint, no means whatsoever being employed to expand the retaining ring or to maintain the retaining ring in its expanded state.

The cylindrical member 20c is provided with an inner circumferential groove 106 which forms an inner circumferential rib 108 at the end of the cylindrical member. The circumferential groove 106 has radial side walls, i.e., side walls in planes perpendicular to the axis of the cylindrical member. Thus the inner circumferential rib 108 forms a rearwardly facing inner circumferential radial locking shoulder 110. In like manner, the second cylindrical member 22c is provided with an inner circumferential groove 112 with radial side walls thereby forming an inner circumferential end rib 114 with a rearwardly facing inner circumferential radial locking shoulder 115.

The inner retaining ring 116 in FIGS. 13 and 14 has two outer circumferential ribs 118 and 120 respectively separated by a relatively wide intermediate outer circumferential groove 122. Here again the outer circumferential groove 122 has radial side walls so that the rib 118 forms an outer circumferential radial locking shoulder 124 to engage the previously mentioned locking shoulder 110 and the second rib 120 forms a similar outer circumferential radial locking shoulder 125 to engage the previously mentioned locking shoulder 115. The rib 118 of the retaining ring 116 is formed with a chamfer 126 and the inner circumferential rib 108 of the cylindrical member 20c may be formed with a similar chamfer 128 for the previously described automatic cam action to cause the retaining ring to be contracted to pass through the rib 108 when the two cylindrical members are forced together.

The width of the groove 122 of the retaining ring and the axial dimensions of the two ribs 108 and 114 of the two cylindrical members are selected to make the joint tight when the locking shoulder 124 of the retaining ring engages the locking shoulder 110 and the locking shoulder 125 of the retaining ring engages the locking shoulder 115. In this instance, a sealing gasket 130 is interposed between the confronting ends of the two cylindrical members and the cooperating parts are dimensioned accordingly. Here again, the width of the groove 106 of the cylindrical member 20c must be close to the width of the groove 112 of the cylindrical member 22c must be close to the width of the corresponding rib 120.

In this particular embodiment of the invention, the rib 120 of the retaining ring 116 is of somewhat larger outside diameter than the second rib 118 of the retaining ring and the groove 112 that receives the rib 120 is correspondingly deepened. As heretofore discussed, this differential in the diameters of the two ribs of the retaining ring ensures that the two locking shoulders 125 and 115 will remain in effective engagement when the retaining ring contracts to pass through the rib 108 of the cylindrical member 20c.

The procedure for assembling the joint is exceedingly simple. The first step is to contract the retaining ring 116 to receive the gasket 130 and to engage the retaining ring with the cylindrical member 22c in the manner shown in FIG. 13. To complete the joint, it is merely necessary to force the two cylindrical members together. As the two cylindrical members move together, first the retaining ring is contracted by cam action to pass through the rib 108 and then the retaining ring expands with a snap action for engagement of the locking shoulder 124 of the retaining ring with the locking shoulder 110. This snap action occurs at the final stage of forcing the two cylindrical members together when the sealing ring 130 is compressed to make the joint fluid-tight.

The described joint is effective and reliable because of a number of factors which work together. In the first place, the retaining ring 116 is resiliently biased to expand to the limit permitted by the surrounding cylindrical members. In the second place, the various locking shoulders 110, 124, 115 and 125 are in planes perpendicular to the axis of the joint and, therefore, have no tendency whatsoever to disengage in response to forces that urge the two cylindrical members apart. In the third place, the locking shoulder 110 engages the locking shoulder 124 in a manner that provides frictional resistance to disengagement, the locking shoulder 115 engages the locking shoulder 125 in the same manner to provide frictional resistance to disengagement, and the resilient compression of the sealing ring 130 creates a permanently exerted force between the ends of the two cylindrical members that is effective to increase these frictional resistances. It is to be further noted that the retaining ring may be relied upon in this manner because the retaining ring is inside the two cylindrical members and, therefore, is completely protected from any external forces which might otherwise cause disengagement of the retaining ring.

The joint has a further advantage for some purposes in that the ring is not easily accessible for opening of the joint. It is possible, of course, to gain limited access to the retaining ring by destroying the sealing gasket 130 but in those instances where a sealing gasket is not required and the ends of the two cylindrical members make metal-to-metal contact, it is practically impossible to gain access to the sealing ring without rupturing the material of at least one of the two cylindrical members. In some instances, it is highly desirable to provide a joint of this character which is exceedingly difficult to dismantle.

The purpose of FIG. 15 is to illustrate a second solution to the problem of maintaining the retaining ring in the desired position when the retaining ring is retracted by cam action and then snaps back into position engaging both of the cylindrical members. One solution, as previously explained, is to make the outside diameter of one rib of the retaining ring larger than the outside diameter of the other ring. The solution exemplified by FIG. 15 is to employ a screw 132 for the same purpose.

The construction shown in FIG. 15 is largely similar to the construction of the first embodiment of the invention, as indicated by the use of corresponding numerals to indicate corresponding parts. One difference, however, is that the ribs 40d and 42d of the retaining ring 24d are of equal outside diameters. The screw 132 loosely extends through an aperture 134 in the cylindrical member 22d and is threaded into the retaining ring 24d as indicated. With the screw 132 holding the retaining ring 24d loosely in place, the joint is assembled in the same manner as the first described embodiment of the invention. After the two cylindrical members 20d and 22d are forced together for interconnection by the retaining ring, however, the screw 132 may be tightened with a gasket 135 interposed to seal the aperture 134.

FIGS. 16, 17 and 18 show how retaining rings may be used that are flush with the inner circumferential surfaces of the cylindrical members that they interconnect. The construction shown in FIG. 16 is largely identical with the first described embodiment of the invention as indicated by the use of corresponding numerals to indicate corresponding parts. The only difference is that the retaining ring 24e and the ends of the two cylindrical members 20e and 22e are so dimensioned that when the joint is completely assembled, the inner circumferential surface of the retaining ring substantially registers with the inner circumferential surfaces of the two cylindrical members.

In FIG. 17, the joint construction is similar to the joint construction of FIGS. 13 and 14 as indicated by the use of corresponding numerals to indicate corresponding parts. Here again, the retaining ring 24f and the ends of the two cylindrical members 20f and 22f are shaped and dimensioned to make the inner circumferential surface of the retaining ring flush with the inner circumferential surfaces of the two cylindrical members when the joint is completely assembled.

FIG. 18 shows how the joint construction shown in FIG. 17 may be modified by making the two ribs of the retaining ring of equal outside diameters and by employing a screw 136 to hold the retaining ring in position during the assembly procedure. A first cylindrical member 140 in FIG. 18 is provided with an inner circumferential groove 142 which forms an inner circumferential end rib 144 having a radial locking shoulder 145. The second cylindrical member 146 is provided with an inner circumferential groove 148 which forms an inner circumferential end rib 150 having a radial locking shoulder 152. A suitable sealing ring 154 may be interposed between the two end ribs 144 and 150 if a fluid-tight joints is desired.

The retaining ring 155 in FIG. 18 has two ribs 156 and 158 of equal outside diameters with an intervening groove 160. The rib 156 forms a radial locking shoulder 162 to cooperate with the previously mentioned locking shoulder 145 and in like manner the rib 148 forms a radial locking shoulder 164 to cooperate with the previously mentioned locking shoulder 152.

The retaining ring 155 may be sufficiently resilient and sufficiently biased for expansion to maintain its locking engagement with the cylindrical member 146 without the aid of any added expedient to keep the ring expanded. The retaining ring 155 and the ends of the two cylindrical members 140 and 146 are so shaped and dimensioned that the inner circumferential surface of the retaining ring is substantially flush with the inner circumferential surface of the two cylindrical members, as indicated in FIG. 18.

In the last embodiment of the invention shown in FIGS. 19 to 21, a first cylindrical member 170 is provided in the usual manner with an inner circumferential groove 172 that forms an inner end rib 174. The end rib 174 has a chamfer 175 at its leading edge and forms a rearwardly facing radial locking shoulder 176.

The second cylindrical member 178 is provided with an outer circumferential groove 180 which forms an outer circumferential end rib 182. The end rib 182 has a chamfer 184 on its leading edge and forms a rearwardly facing radial locking shoulder 185. The second side of the groove 180 forms a forwardly facing outer circumferential radial shoulder 188 to confront the end of the first cylindrical member 170 and to cooperate therewith to compress a sealing ring 190 if such a sealing ring is provided to make the joint fluid-tight.

To permit contraction of the end rib 182 of the cylindrical member 178, as required to pass through the rib 174 of the cylindrical member 170, a series of circumferentially spaced longitudinal end slots 192 may be provided in the cylindrical member in the manner shown in FIG. 21. These end slots 192 extend at least partially across the outer circumferential groove 180 to form a plurality of end tongues 194 that are sufficiently flexible to yield to the inner end rib 174 when the two cylindrical members are forced together.

It is apparent that when the two cylindrical members 170 and 178 are positioned as shown in FIG. 19 and are then forced together, the tongues 194 are flexed radially inward by the camming cooperation of the chamfers 175 and 184 with consequent contraction of the end rib 182 sufficiently to pass through the end rib 174. When the rib 182 clears the rib 174, the tongues 194 snap back for engagement of the locking shoulder 185 of the cylindrical member 178 with the locking shoulder 176 of the cylindrical member 170.

At the final assembled positions of the two cylindrical members 170 and 178 shown in FIG. 20, the sealing ring 190 is in resilient compression to create relatively high pressure between the locking shoulders 176 and 185 with consequent high frictional resistance to disengagement of the two shoulders. It is apparent that the resulting joint is even more tamper-proof than the joint shown in FIGS. 13 and 14. Even if the resilient sealing gasket 190 is completely removed, the tongues 194 are still inaccessible for flexure to permit separation of the two cylindrical members.

My description in specific detail of the various embodiments of the invention will suggest various changes, substitutions and other departures from my disclosure within the spirit and scope of the appended claims.

I claim:
1. A joint structure for interconnecting the confronting ends of a first cylindrical member and a second cylindrical member, comprising: a retaining ring to fit inside said two cylindrical members in a position bridging said confronting ends, said ring being of split construction with spaced ends for flexural expansion and contraction, said first cylindrical member having a first inner circumferential groove forming a first rearwardly directed inner cam shoulder, said retaining ring having a first outer circumferential rib having a first diameter and forming a first outer cam shoulder paired with said inner cam shoulder for cooperation therewith to draw said first cylindrical member and said retaining ring axially towards each other in response to expansion of the retaining ring, said second cylindrical member having a second inner circumferential groove forming both a second rearwardly directed inner cam shoulder, and a third forwardly directed inner shoulder, said retaining ring having a second outer circumferential rib having a second diameter and forming a second outer cam shoulder paired with said second inner cam shoulder for cooperation therewith to draw said second cylindrical member and said retaining ring axially towards each other in response to expansion of the ring, said second rib forming a third outer shoulder to cooperate with said third inner shoulder; said second and third shoulders of said second groove being axially spaced a distance substantially equal to the width of said second rib; and separate means operatively coupled to the ring to spread said ring ends apart to expand the ring for cam action at said cam shoulders to draw said confronting ends together, said second inner shoulder and said second outer shoulder being dimensioned for mutual engagement when the ring is contracted to a degree to disengage said first rib from said first groove thereby preventing separation of said ring and said second cylindrical member, said third inner shoulder and third outer shoulder being positioned to hold the retaining ring sufficiently advanced relative to said second cylindrical member for engagement of said first outer cam shoulders of the retaining ring with said first inner cam shoulder of the first cylindrical member when the two cylindrical members are moved together whereby with the two cylindrical members separated, said retaining ring may be engaged with said second cylindrical member and then the two cylindrical members may be forced together to cause said retaining ring to telescope into said first cylindrical member and snap into engagement with said first inner cam shoulder.

2. A joint structure comprising first and second juxtaposed axially aligned cylindrical tubes, the adjacent end portions of said first and second tubes having radially inwardly extending first and second annular shoulders, respectively, an expansible retaining ring disposed within and bridging said tubes, said ring including a first axially spaced radially outwardly extending rib having a first diameter and having a first shoulder engageable with said first shoulder on said first tube for securing said ring and said tube and including a second axially spaced radially outwardly extending rib having a second diameter greater than the first diameter and having a particular axial width and having a second shoulder engageable with said second shoulder on said second tube for securing said ring and said second tube, means on said second tube forming an inwardly extending annular third shoulder axially spaced from said second shoulder and forming a groove therewith receiving said second rib and having substantially the particular axial width, and means for radially outwardly expanding said ring.

References Cited in the file of this patent

UNITED STATES PATENTS

| 115,906 | Stine | June 13, 1871 |
| 831,551 | Guttzeit | Sept. 25, 1906 |
| 1,908,474 | Dewees | May 9, 1933 |
| 2,650,115 | Taylor | Aug. 25, 1953 |
| 2,656,594 | Westling | Oct. 27, 1953 |
| 2,775,472 | Brown | Dec. 25, 1956 |
| 2,836,117 | Lankford | May 27, 1958 |
| 2,945,704 | Korn | July 19, 1960 |
| 2,989,888 | Broack | June 27, 1961 |

FOREIGN PATENTS

| 21,558 | Norway | July 10, 1911 |
| 414,555 | Germany | June 8, 1925 |